277
2,935,447
APPETITE DEPRESSANT CONTAINING ALGINATE

Aaron Miller, La Jolla, and Foss Edmund Corley, San Diego, Calif., assignors to Kelco Company, San Diego, Calif., a corporation of Delaware No Drawing. Application February 19, 1957
Serial No. 641,043

8 Claims. (Cl. 167—55)

This invention relates to a new water soluble alginate composition having special utility as an appetite depressant.

A serious difficulty for persons advised to reduce the ingestion of food for medical reasons or for purposes of diet is the feeling of emptiness in the stomach accompanied by the unpleasant gnawing pangs of hunger. It has been shown medically that it is possible to inflate a balloon in the empty stomach of a person and thus relieve this uncomfortable feeling. It is readily realized that it is utterly impractical for a dieting person to gain relief in this manner.

Heretofore, various compositions have been suggested as appetite depressants. However, such compositions have been either difficult to dissolve in water and swallow, unpalatable and/or difficult to pass from the stomach after the function of depressing the appetite has been served.

In accordance with our invention we have discovered a low viscosity water soluble alginate appetite depressant composition hereinafter described, that may be readily dissolved in water and swallowed. Such a solution of our appetite depressant will form a soft gel in the presence of the hydrochloric acid normally present in the stomach. This gel will form in from one to fifteen minutes after our composition enters the stomach and will give the patient a startling psychological and physiological feeling of fullness. Thus, with most of the physical hunger satisfied, the dieting patient then finds it easy to reduce the amount of food ingested. Normally, the acid stomach contents are discharged into the small intestines which have an alkaline reaction. The acidic gel that has been formed in the stomach in accordance with our invention will be disrupted almost immediately by the neutralization of the acid therein by the alkali present in the small intestine. This causes the said gel to be reduced to a fluid which will pass throughout the intestinal tract in a normal manner and be discharged in the stools. Thus, in accordance with our invention, a gel is formed in the stomach to satiate the hunger pangs and yet is reduced to a fluid condition in the intestine so that it readily passes from the body and does not form an obstruction in the intestine.

It is an object, therefore, of this invention to provide a new and novel alginate appetite depressant composition that is readily dispersible in water.

It is a further object of this invention to provide a water soluble alginate composition that is easily drinkable.

It is another object of this invention to provide an alginate composition that will produce a gel in the presence of stomach acids.

It is still a further object of this invention to provide an alginate composition that will form a relatively soft, voluminous gel in the presence of stomach acids and will be reduced to a fluid condition by the alkali present in the small intestine.

It is another object of this invention to provide a new and useful composition for use as an appetite depressant.

Further and other objects of the invention will be apparent from the disclosure and description of the invention to follow:

In accordance with this invention, we have found a new and useful appetite depressant composition comprising a low viscosity alginate and a molasses which is preferably one known in the industry as a straight can refiner's syrup. This composition has good dispersion and solubility in water. A water solution of such a composition was found to be readily drinkable and formed a gel in the presence of hydrochloric acid of simulated stomach strength. The gel so formed was readily broken into a fluid condition by the addition of a small amount of an alkali to simulate the conditions in the small intestine. In accordance with our invention, we have found still further that if to our aforesaid appetite depressant composition a small amount of an insoluble calcium salt such as tricalcium phosphate were added, the gel would become of a more continuous consistency. This gel, in accordance with the preferred embodiment of our invention, was likewise submitted to a treatment with an alkali simulating stomach condition. Again, the gel was broken to a fluid condition that would readily pass through the intestines and out of the body.

The low viscosity water soluble alginates that we have found suitable in accordance with our invention are alkali metal alginates, magnesium alginate, ammonium alginate, and dry mixtures of alginates such as ammonium or sodium alginate with calcium alginate. These alginates are well known and are commercially available from the Kelco Company in San Diego, California. The viscosity of these alginates may be conveniently measured with a Brookfield Viscosimeter. In our Appetite Depressant Composition, we prefer to use such alginates having a 2% viscosity (dry weight of algin) in water in the range of 25 to 1000 centipoises and preferably about 100 centipoises as measured by a Brookfield Viscosimeter. The aforesaid alginates, while usually referred to as water soluble alginates, do not disperse readily in water, and in the usual commercial use special techniques such as high shear agitation are necessary to properly disperse and dissolve these so-called water soluble alginates. It will be apparent that a patient dissolving a teaspoonful of an Appetite Depressant in water could not readily resort to such techniques to dissolve an appetite depressant.

The molasses which is preferably a straight cane refiner's syrup that we combine with a water soluble alginate to produce a palatable and suitable appetite depressant composition is likewise a commercial product. It may be purchased from cane sugar refiners. It is a dark brown liquid containing approximately 75% solids. Such a material may be obtained from the California & Hawaiian Sugar Refining Corporation, San Francisco, under the trade name Dark Brown Liquicane Syrup.

In preparing our composition we coat the water soluble alginate particules with the said refiner's syrup and dry the resulting product to the extent that it is free flowing. It is thereafter milled and sized. This product, either alone or in combination with other additives to be hereinafter discussed, is then ready for use.

In general, we prefer to use from 10% to 70% of a molasses such as straight cane refiner's syrup on a dry weight or solid basis per dry weight of the water soluble alginate employed. In the event other additives are included in our composition it is usually necessary to use in excess of said quantity in that the said molasses will also coat the particles of the other materials present.

The insoluble or very slightly soluble calcium salts suitable for use in combination with the foregoing alginate and molasses are such salts as tricalcium phosphate, dicalcium phosphate, calcium carbonate and calcium tartrate. Such calcium salts, in order to produce a soft gel in accordance with our invention, should be present in an amount equal to one-quarter or more of the stoichiometric equivalent of the alginate.

In the foregoing we have pointed out that it is desirable that any solution used as an appetite depressant be easy to take by the patient. In other words, if the viscosity of a solution of an appetite depressant be too high it will be difficult for the patient to swallow the solution. Our composition, as aforesaid, does produce a suitable appetite depressant of low enough viscosity to be readily swallowed when dissolved in water. However, our composition may be improved in this regard by the use of an edible sequestering agent. Such agents that are suitable for our purposes are tetra-sodium pyrophosphate, sodium hexametaphosphate and disodium phosphate.

It will be apparent to those skilled in the pharmaceutical arts, and in accordance with the usual practice in said arts, that it is often desirable or necessary to add an extender to certain materials that are to be used for medicinal purposes. Thus, for example, if the desired dosage is something less than a teaspoon, in pharmaceutical practice extenders are often added so that the active ingredients are present in the desired amount when extended by additives to fill up a teaspoon. In utilizing the composition of our invention comprising a water soluble alginate, a molasses such as straight cane refiner's syrup, and preferably in combination with an insoluble calcium salt, we can use finely ground cane sugar as an extender to meet dosage requirements.

The following are examples of our invention:

*Example 1*

20 parts of potassium alginate having a 2% viscosity in water of 194 cps. as measured by a Brookfield viscosimeter were mixed with 60 parts of fine ground cane sugar and 27 parts of a straight cane refiner's syrup (having 75% total solids). This mixture was dried and ground to pass a 20 mesh screen. This product has good dispersion and solubility in water. When 6.5 grams of this product was dissolved in 177 ml. of water, it had a viscosity of 18 cps. as measured by a Brookfield viscosimeter. When this solution was added to 50 cc. of 0.084 N hydrochloric acid, a light semi-continuous gel formed. This acid approximates normal stomach conditions. The gel so formed was then treated with a small amount of an alkali to simulate alkalinity of the small intestine. The gel so formed was then reduced to a fluid condition.

*Example 2*

A further composition was prepared in accordance with the method set forth in Example 1, except 0.13 part of calcium phosphate was added to the formulation, the resulting gel that formed upon the addition of the hydrochloric acid solution had a soft continuous consistency. It likewise was broken to a fluid condition by the addition of an alkali simulating small intestine conditions.

*Example 3*

20 parts of sodium alginate having a 2% viscosity of 100 cps. were mixed with 3.2 parts calcium tartrate, 1 part of tetrasodium pyrophosphate, 53.2 parts of fine ground cane sugar, and 20 parts of a straight cane refiner's syrup. This mixture was dried and ground to pass a 40 mesh screen and retained on a 100 mesh screen (Tyler Standard Screen Scale). This product had excellent dispersion and fast solubility. When 6.5 grams of this product was dissolved in 177 ml. of water, it had a viscosity of 18 cps. as measured by a Brookfield viscosimeter. When this solution was added to 50 cc. of 0.084 N hydrochloric acid a soft gel formed in about five minutes. This gel was likewise broken to a fluid condition by the addition of a small amount of an alkali simulating conditions in the small intestines.

*Example 4*

20 parts of a sodium alginate (as described in Example 3) were mixed with 58 parts of fine ground cane sugar, 1.4 parts of tricalcium phosphate, and 20 parts of a straight cane refiner's syrup. This mixture was dried and ground to pass a 40 mesh screen but retained on a 100 mesh screen. This product had excellent dispersion and good solubility. This composition likewise formed a soft gel upon the addition of hydrochloric acid solution simulating stomach conditions and the gel formed was broken by the addition of an alkali simulating small intestine conditions.

*Example 5*

20 parts of a sodium alginate (as described in Example 3) were mixed with 53.6 parts of fine ground cane sugar, 1.4 parts of tricalcium phosphate, and 25 parts of light Louisiana molasses. This mixture was dried and ground to pass a 40 mesh screen but retained on a 100 mesh screen. This product was most palatable, had excellent dispersion and good solubility. This composition likewise formed a soft gel upon the addition of hydrochloric acid solution simulating stomach conditions and the gel formed was broken by the addition of an alkali simulating small intestine conditions.

It will be apparent to those skilled in the art that various modifications of the foregoing can be made in accordance with our invention as described in the foregoing and within the scope of the following claims. Thus for example, other appetite depressants or certain reducing drugs can be included as a part of our new composition. Still further materials that can be added to our appetite depressant composition include mineral and vitamin supplements.

We claim:

1. A composition particularly suitable for use as an appetite depressant in which the active ingredients consist essentially of a low viscosity water soluble alginate, 10% to 70% of a molasses dry weight based on the dry weight of the alginate and an insoluble calcium salt in an amount equal to at least ¼ of the stoichiometric equivalent of the said alginate said calcium salt being selected from the group consisting of tricalcium phosphate, dicalcium phosphate, calcium carbonate, calcium phosphate and calcium tartrate.

2. A composition that is readily dispersible in water and suitable for use as an appetite depressant comprising a low viscosity water soluble alginate, straight cane refiner's syrup and an insoluble calcium salt selected from the group consisting of tricalcium phosphate, dicalcium phosphate, calcium carbonate, calcium phosphate and calcium tartrate, said calcium salt being present in an amount at least equal to ¼ of the stoichiometric equivalent of the said alginate.

3. An appetite depressant composition that is readily dispersible in water in which the active ingredients consist essentially of a low viscosity water soluble alginate, 10% to 70% of a light Louisiana molasses dry weight based on the dry weight of the alginate and an insoluble calcium salt selected from the group consisting of tricalcium phosphate, dicalcium phosphate, calcium carbonate, calcium phosphate and calcium tartrate, said calcium salt being present in an amount at least equal to ¼ of the stoichiometric equivalent of the said alginate.

4. An appetite depressant composition that is readily dispersible in water in which the active ingredients consist essentially of a sodium alginate having from 25 to 1000 centipoise viscosity as measured by a Brookfield viscosimeter, 10% to 70% of a straight cane refiner's syrup dry weight based on the dry weight of the alginate and an insoluble calcium salt selected from the group consisting of tricalcium phosphate, dicalcium phosphate, calcium carbonate, calcium phosphate and calcium tartrate, said calcium salt being present in an amount at least equal to ¼ of the stoichiometric equivalent of the said alginate.

5. An appetite depressant composition that is readily dispersible in water comprising a low viscosity water soluble alginate, approximately 10% to 70% straight cane refiner's syrup dry weight based on the dry weight of the alginate and calcium tartrate in an amount at least equal to ¼ of the stoichiometric equivalent of the said alginate.

6. An appetite depressant composition that is readily dispersible in water comprising a low viscosity water soluble alginate, approximately 10% to 70% straight cane refiner's syrup dry weight based on the dry weight of the alginate and tricalcium phosphate in an amount at least equal to ¼ of the stoichiometric equivalent of the said alginate.

7. An appetite depressant composition that is readily dispersible in water comprising a sodium alginate having about 100 centipoise viscosity as measured by a Brookfield viscosimeter, approximately 10% to 70% of a straight cane refiner's syrup dry weight based on the dry weight of the alginate and an insoluble calcium salt selected from the group consisting of tricalcium phosphate, dicalcium phosphate, calcium phosphate, calcium carbonate and calcium tartrate, said calcium salt being present in an amount at least equal to ¼ of the stoichiometric equivalent of the said alginate.

8. A composition particularly suitable for use as an appetite depressant comprising approximately 20 parts of a low viscosity sodium alginate, 58 parts of fine ground cane sugar, 1.4 parts of tricalcium phosphate and 20 parts of straight cane refiner's syrup.

References Cited in the file of this patent

UNITED STATES PATENTS

| | | |
|---|---|---|
| 2,441,729 | Steiner | May 18, 1948 |
| 2,714,083 | Ferguson | July 26, 1955 |
| 2,808,337 | Gibsen | Oct. 1, 1957 |
| 2,809,893 | Poarch | Oct. 15, 1957 |

OTHER REFERENCES

Drug and Cos. Ind., vol. 72, No. 4, April 1953, p. 485.

Mulinos: Gastroenterology, vol. 24, No. 3, July 1953, pp. 385–393.

Berger: Am. J. Digestive Diseases, vol. 20, No. 2, February 1953, pp. 39–42.